(12) United States Patent
Ichikawa et al.

(10) Patent No.: US 9,461,477 B2
(45) Date of Patent: Oct. 4, 2016

(54) POWER TRANSFER SYSTEM

(75) Inventors: Keiichi Ichikawa, Nagaokakyo (JP); Henri Bondar, Kyoto (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 1054 days.

(21) Appl. No.: 13/569,277

(22) Filed: Aug. 8, 2012

(65) Prior Publication Data

US 2012/0299392 A1    Nov. 29, 2012

Related U.S. Application Data

(63) Continuation of application No. PCT/JP2011/061149, filed on May 16, 2011.

(30) Foreign Application Priority Data

May 28, 2010  (JP) .................................. 2010-122227

(51) Int. Cl.
*H02M 3/06*     (2006.01)
*H02J 5/00*     (2016.01)
*H02J 17/00*    (2006.01)

(52) U.S. Cl.
CPC ............... *H02J 5/005* (2013.01); *H02J 17/00* (2013.01)

(58) Field of Classification Search
CPC .................................. H02J 5/005; H02J 17/00
USPC ......................................................... 307/104
See application file for complete search history.

(56) References Cited

U.S. PATENT DOCUMENTS 2,483,889 A  *  10/1949  De Groot ................ H03J 7/042
                                                    330/167
6,859,050 B2     2/2005   van de Goor et al.
(Continued)

FOREIGN PATENT DOCUMENTS

EP    2309620     *  10/2010
FR    2875649 A1    3/2006
(Continued)

OTHER PUBLICATIONS

PCT/JP2011061149 International Report date Aug. 16, 2011.

*Primary Examiner* — Jared Fureman
*Assistant Examiner* — Emmanuel R Dominique
(74) *Attorney, Agent, or Firm* — Arent Fox LLP

(57) ABSTRACT

The frequency generated by a high-frequency high-voltage generator is set to a higher one of the frequencies of two coupled modes which take place when a resonance circuit of a power transmission device and that of a power reception device are coupled to each other. For this reason, charge generated on an active electrode of the power transmission device and that generated on an active electrode of the power reception device have the same polarity, while an electric potential of a passive electrode of the power transmission device and that of a passive electrode of the power reception device have the same polarity. When the passive electrode of the power transmission device is connected to the ground, the electric potential of the passive electrode is zero V. Therefore, the electric potential of the passive electrode of the power reception device is substantially zero V.

13 Claims, 12 Drawing Sheets

(56) References Cited

U.S. PATENT DOCUMENTS

| | | |
|---|---|---|
| 6,865,409 B2 | 3/2005 | Getsla et al. |
| 8,587,157 B2 | 11/2013 | Camurati et al. |
| 2009/0206675 A1* | 8/2009 | Camurati ............... H02J 17/00 307/104 |
| 2009/0302690 A1* | 12/2009 | Kubono ................. H02J 5/005 307/109 |
| 2010/0164295 A1* | 7/2010 | Ichikawa ............... H02J 7/025 307/104 |
| 2011/0080054 A1* | 4/2011 | Urano .................... H02J 5/005 307/104 |
| 2011/0285212 A1* | 11/2011 | Higuma ................. H02J 5/005 307/104 |
| 2012/0032521 A1* | 2/2012 | Inoue .................... B60L 11/123 307/104 |
| 2012/0235508 A1* | 9/2012 | Ichikawa ............... H02J 5/005 307/104 |

FOREIGN PATENT DOCUMENTS

| | | |
|---|---|---|
| JP | 2009-531009 A | 8/2009 |
| JP | 2009-296857 A | 12/2009 |
| JP | 2010-150316 A | 7/2010 |
| JP | 2010-213554 A | 9/2010 |
| WO | WO-2007-107642 A1 | 9/2007 |
| WO | WO 2007107642 * | 9/2007 |
| WO | WO-2009-024731 A2 | 2/2009 |
| WO | WO-2010-150317 A1 | 12/2010 |
| WO | WO-2010-150318 A1 | 12/2010 |
| WO | WO-2010150316 A1 | 12/2010 |

* cited by examiner

POWER TRANSFER SYSTEM

CROSS REFERENCE TO RELATED APPLICATIONS

The present application is a continuation of International application No. PCT/JP2011/061149, filed May 16, 2011, which claims priority to Japanese Patent Application No. 2010-122227, filed May 28, 2010, the entire contents of each of which are incorporated herein by reference.

FIELD OF THE INVENTION

The present invention relates to a power transfer system configured to transfer electric power in a noncontact manner.

BACKGROUND OF THE INVENTION

Patent Literature 1 discloses a system configured to transfer electric power through capacitive coupling.

The power transfer system disclosed in Patent Literature 1 comprises: a power transmission device including a high-frequency high-voltage generator circuit, a passive electrode, and an active electrode; and a power reception device including a high-frequency high-voltage load, a passive electrode, and an active electrode.

FIG. 1 is a view illustrating the basic configuration of the power transfer system disclosed in Patent Literature 1. The power transmission device includes a high-frequency high-voltage generator circuit 1, a passive electrode 2, and an active electrode 3. The power reception device includes a high-frequency high-voltage load 5, a passive electrode 7, and an active electrode 6. The active electrode 3 of the power transmission device and the active electrode 6 of the power reception device are located in proximity to each other via a gap 4, so that the two electrodes are capacitively coupled to each other.

Patent Literature 1: National Publication of International Patent Application No. 2009-531009

SUMMARY OF THE INVENTION

FIG. 2 illustrates exemplary instantaneous charges imposed on an active electrode and a passive electrode. As shown in FIG. 2, the charge on the active electrode 3 of the power transmission device 100 and that on the active electrode 6 of the power reception device 200 have opposite polarities and, likewise, the charge on the passive electrode 2 of the power transmission device 100 and that on the passive electrode 7 of the power reception device 200 have opposite polarities.

The power transfer system of the structure described in Patent Literature 1 transfers electric power by utilizing an electric field generated between the active electrodes 3 and 6 and that generated between the passive electrodes 2 and 7. For this reason, the power transfer system involves a problem that when the capacitance between the passive electrodes 2 and 7 is small, that is, when the capacitive coupling between the passive electrodes 2 and 7 is weak, the electric potentials of the passive electrodes 2 and 7 fluctuate largely. Further, since the passive electrode 7 of the power reception device is isolated from the ground potential and hence becomes a radiation source of an unnecessary electromagnetic field, the power transfer system also involves a problem that such an unnecessary electromagnetic field radiates with electric potential fluctuations of the passive electrode 7.

According to Patent Literature 1, an attempt is made to stabilize the electric potential of the passive electrode by increasing the area of the passive electrode. Though no problem arises if the passive electrode is shaped sufficiently large, a sufficient effect cannot be obtained in some apparatus configurations.

Accordingly, it is an object of the present invention to provide a power transfer system which is capable of suppressing radiation of the unnecessary electromagnetic field from the passive electrode of the power reception device.

A power transfer system according to the present invention has the following configuration:

a power transmission device that includes a power transmission device side active electrode, a power transmission device side passive electrode, and a high-frequency high-voltage generator circuit configured to apply a high voltage of high frequency to between the power transmission device side active electrode and the power transmission device side passive electrode; and a power reception device that includes a power reception device side active electrode opposed to the power transmission device side active electrode, a power reception device side passive electrode, and a high-frequency high-voltage load circuit connected between the power reception device side active electrode and the power reception device side passive electrode, wherein the high-frequency high-voltage generator circuit generates a high voltage having a frequency such that a phase difference between a phase of an electric potential difference between the power transmission device side active electrode and the power transmission device side passive electrode and a phase of an electric potential difference between the power reception device side active electrode and the power reception device side passive electrode has an absolute value of not less than zero degrees and less than 90 degrees.

With this configuration, a fluctuation in the electric potential of the power reception device side passive electrode is the same (in polarity) as that in the electric potential of the power transmission device side passive electrode which is close to the ground potential, whereby the electric potential fluctuation of the power reception device side passive electrode can be suppressed. Thus, it is possible to suppress radiation of an unnecessary electromagnetic field without lowering the power efficiency.

In a specific embodiment, a resonance frequency of a power transmission circuit comprising the power transmission device side active electrode, the power transmission device side passive electrode and the high-frequency high-voltage generator circuit is substantially equal to a resonance frequency of a power reception circuit comprising the power reception device side active electrode, the power reception device side passive electrode and the high-frequency high-voltage load circuit, while the frequency of the high voltage to be applied to between the power transmission device side active electrode and the power transmission device side passive electrode is a higher one of frequencies of two coupled modes which are generated when the power transmission device and the power reception device are coupled to each other.

When the power transmission device side passive electrode has an electric potential substantially equal to a ground potential (i.e., the electric potential of the earth or housing), the electric potential of the power reception device side passive electrode is stabilized, so that radiation of the unnecessary electromagnetic field is suppressed effectively.

When the power transmission device side passive electrode is larger in size than the power transmission device side active electrode or when the power reception device side passive electrode is larger in size than the power reception device side active electrode, a change in the electric potential of the power reception device side passive electrode becomes small relative to the electric potential of the power transmission device side passive electrode. Therefore, the electric potential of the power reception device side passive electrode is further stabilized, so that radiation of the unnecessary electromagnetic field is suppressed effectively.

When the power transmission device side active electrode, the power transmission device side passive electrode, the power reception device side active electrode and the power reception device side passive electrode are disposed in such a manner that the power transmission device side passive electrode is opposed to the power reception device side passive electrode while the power transmission device side active electrode is opposed to the power reception device side active electrode, the capacitance generated between the power transmission device side passive electrode and the power reception device side passive electrode becomes larger, which makes the electric potential fluctuation of the power reception device side passive electrode smaller, thereby suppressing radiation of the unnecessary electromagnetic field effectively.

When the power transmission device is provided with an LC resonance circuit, the resonance frequency of the power transmission circuit can be easily set to a predetermined frequency. Likewise, when the power reception device is provided with an LC resonance circuit, the resonance frequency of the power reception circuit can be easily fixed to a predetermined frequency.

According to the present invention, it is possible to control the electric potential fluctuation of the power reception device side passive electrode, thereby to suppress radiation of the unnecessary electromagnetic field from the power reception device side passive electrode.

DETAILED DESCRIPTION OF THE PREFERRED EMBODIMENTS

First Embodiment

The configuration of a power transfer system according to a First Embodiment will be described with reference to FIGS. 3A-3B to 7.

Figure 1:
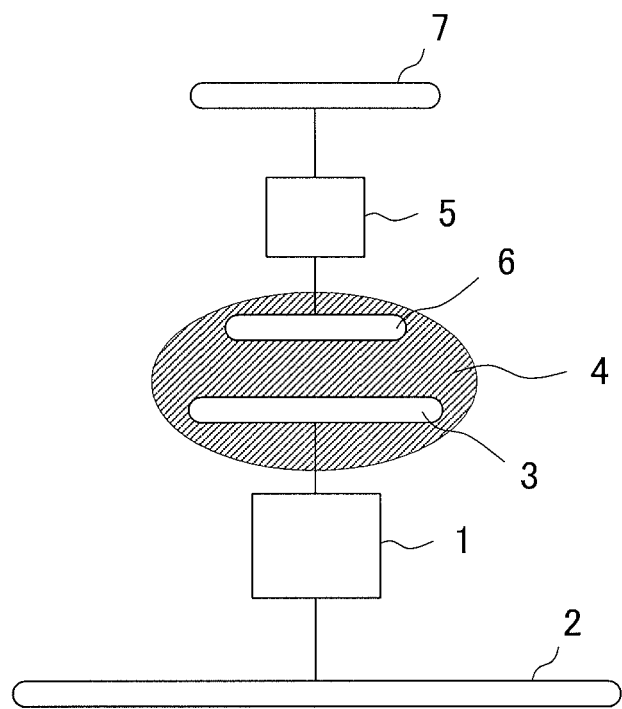
FIG. 1 is a view illustrating the basic configuration of a power transfer system described in Patent Literature 1.
Figure 2:
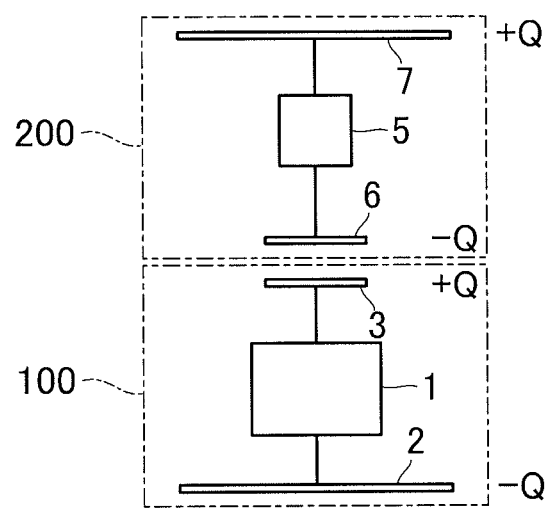
FIG. 2 is a diagram illustrating exemplary instantaneous charges on active electrodes and passive electrodes.
Figure 3A:
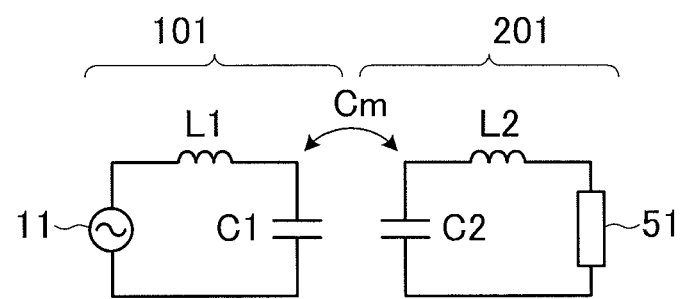
FIGS. 3A and 3B are each an equivalent circuit diagram of a power transfer system according a First Embodiment.
Figure 3B:
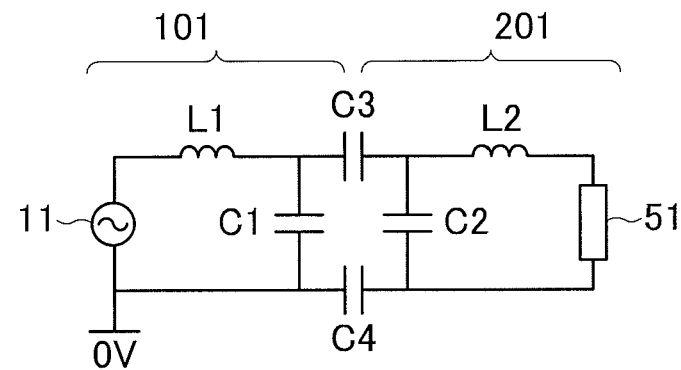

FIGS. 3A and 3B are each an equivalent circuit diagrams of the power transfer system according the First Embodiment. As shown in FIG. 3A, a power transmission device 101 is depicted as comprising a high-frequency high-voltage generator 11, an inductor L1 and a capacitance C1, while a power reception device 201 is depicted as comprising a high-frequency high-voltage load 51, an inductor L2 and a capacitance C2. Cm represents a coupling capacitance.

In FIG. 3A, the high-frequency high-voltage generator 11 is an ideal voltage source. In the present invention, the "high voltage" is meant by a voltage having an effective value of not less than 100 V. The "high frequency" is meant by a frequency ranging from 100 kHz to several tens of MHz. The inductor L1 is an inductance component of the power transmission device 101, for example, an inductance component of a step-up transformer. The inductor L2 is an inductance component of the power reception device 201, mainly, of a step-down transformer for example. The high-frequency high-voltage load 51 is a resistance component mainly of a circuit on the secondary side of the step-down transformer for example.

The capacitances C1, C2 and Cm are capacitances generated by power transmission device side active and passive electrodes and power reception device side active and passive electrodes. The capacitances C1, C2 and Cm are simplified representations of capacitance components derived from electric field distributions that occur over the three-dimensional structures of the respective electrodes.

In FIG. 3B, the capacitively coupled portions of FIG. 3A are expressed as four coupling capacitances C1, C2, C3 and C4 for convenience.

Thus, the power transmission device 101 has a power transmission circuit provided with an LC resonance circuit, while the power reception device 201 has a power reception circuit provided with an LC resonance circuit.

Figure 4A:
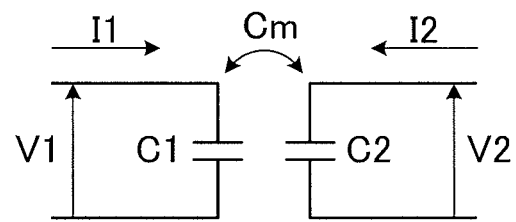
FIG. 4A is a diagram illustrating voltages and currents of the equivalent circuit shown in FIG. 3A.
Figure 4B:
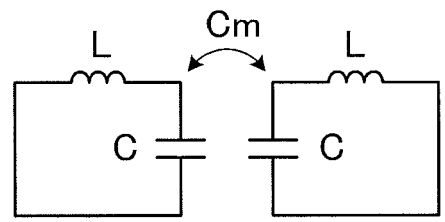
FIG. 4B is a diagram illustrating the configuration of resonance circuits formed in the equivalent circuit.

With reference to FIGS. 4A and 4B, description is made of an expression of relation between the capacitively coupled portions of the equivalent circuit shown in FIG. 3A and resonance frequencies of the coupled resonance circuits.

The relation between voltages V1 and V2, currents I1 and I2 and capacitances C1, C2 and Cm in FIG. 4A is represented by the following expression:

$$\begin{bmatrix} I_1 \\ I_2 \end{bmatrix} = \begin{bmatrix} j\omega C_1 & -j\omega C_m \\ -j\omega C_m & j\omega C_2 \end{bmatrix} \begin{bmatrix} V_1 \\ V_2 \end{bmatrix} \quad (1)$$

Assuming that: the resonance circuits are symmetrical circuits; the inductors L1 and L2 each have an inductance L; and the capacitances C1 and C2 are each a capacitance C, the resonance frequencies of the circuits coupled to each other are represented by the following expressions:

$$f1 = \frac{1}{2\pi\sqrt{L(C+C_m)}} \quad (2)$$

$$f2 = \frac{1}{2\pi\sqrt{L(C-C_m)}} \quad (3)$$

As can be seen from the expressions, a lower resonance frequency f1 and a higher resonance frequency f2 are generated. Note that when the coupling capacitance Cm is zero, that is, when the power transmission device 101 and the power reception device 201 stand alone in an uncoupled state, the resonance circuits generate an equal resonance frequency which is a mid-frequency between f1 and f2.

Figure 5:
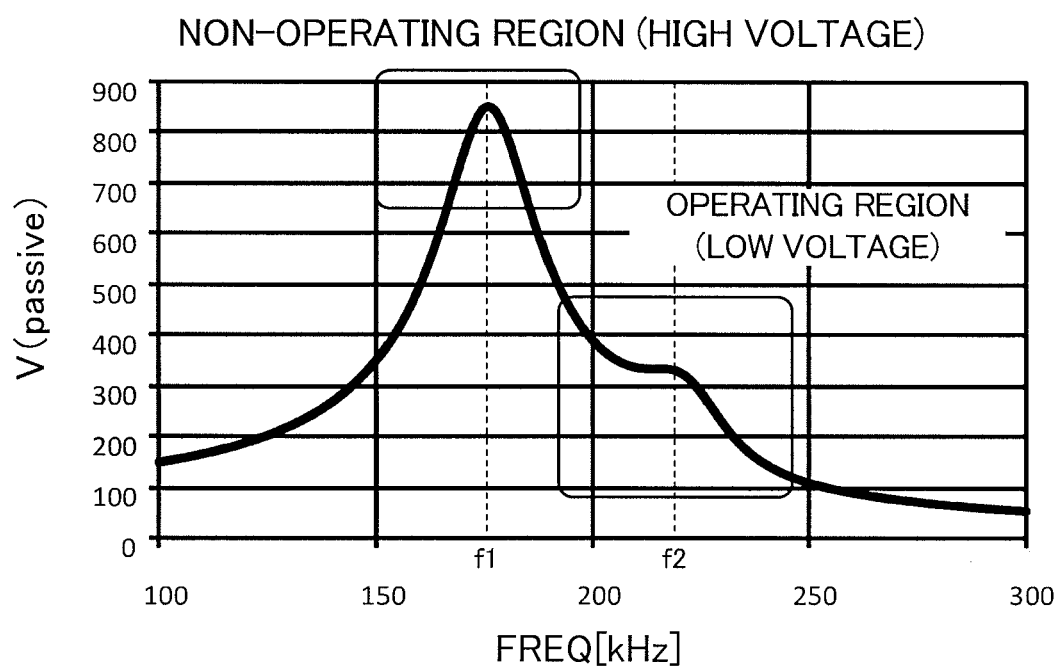
FIG. 5 is a chart illustrating a frequency characteristic of voltage at a power reception device side passive electrode.
Figure 6:
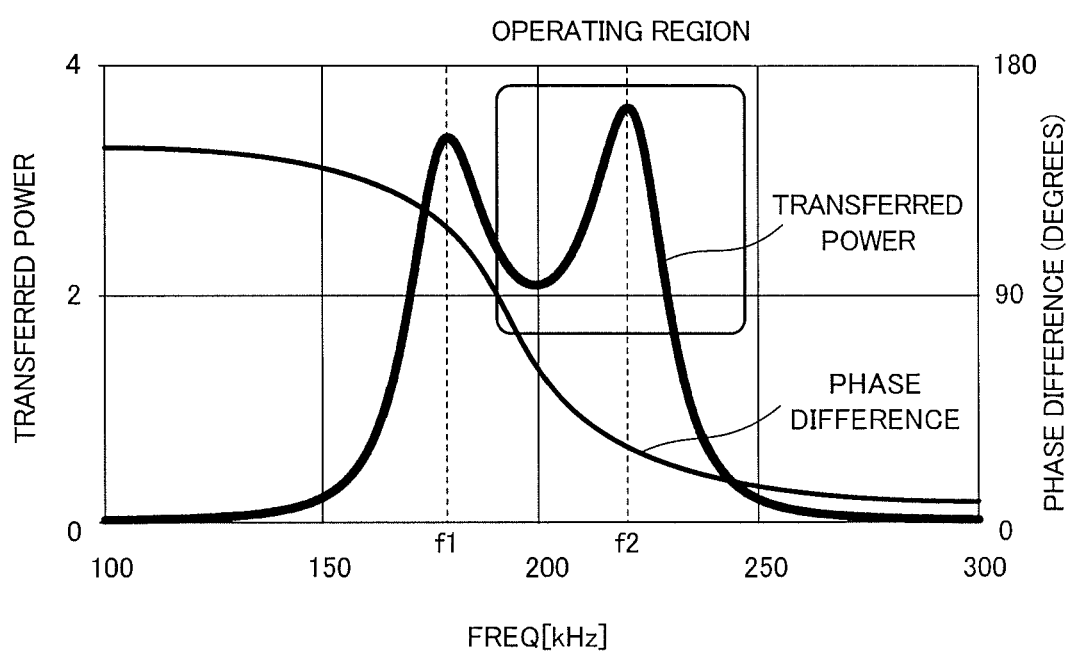
FIG. 6 is a chart illustrating a phase difference between the phase of an electric potential difference between a power transmission device side active electrode and a power transmission device side passive electrode and the phase of an electric potential difference between a power reception device side active electrode and a power reception device side passive electrode, as well as a frequency characteristic of power transferred by the power transfer system.

FIG. 5 is a chart illustrating a frequency characteristic of voltage at the power reception device side passive electrode. FIG. 6 is a chart illustrating a phase difference between the phase of an electric potential difference between the power transmission device side active electrode and the power transmission device side passive electrode and the phase of an electric potential difference between the power reception device side active electrode and the power reception device side passive electrode, as well as a frequency characteristic of power transferred by the power transfer system. In these charts, the elements shown in FIG. 3B assume the following values:

L1=50 mH, Q=100
L2=50 mH, Q=100
C1=10 pF
C2=10 pF
C3=5 pF
C4=10 pF
R=20 Ω

For simplicity, C1 to C4 are lossless values.

As can be seen from FIG. 5, when the frequency of the high-frequency high-voltage generator 11 is set to the higher resonance frequency f2, the voltage at the power reception device side passive electrode becomes lower. If the frequency of the high-frequency high-voltage generator 11 is set to the lower resonance frequency f1, the voltage at the power reception device side passive electrode becomes higher. When the frequency of the high-frequency high-voltage generator 11 is set to f2, the voltage at the power reception device side passive electrode is lowered to a value about ⅓ as high as the voltage obtained with the frequency of the high-frequency high-voltage generator 11 set to f1.

When the frequency of the high-frequency high-voltage generator 11 is set to a mid-frequency ((f1+f2)/2) between the higher resonance frequency f2 and the lower resonance frequency f1, the voltage at the power reception device side passive electrode is lowered to a value about ½ as high as the voltage obtained with the frequency of the high-frequency high-voltage generator 11 set to f1.

For this reason, the high-frequency high-voltage generator 11 is inhibited to operate at least in a frequency region close to the lower resonance frequency f1. That is, the high-frequency high-voltage generator 11 is allowed to operate within a frequency region enclosed by a box in FIG. 6 which is inclusive of the higher resonance frequency f2 and the mid-frequency ((f1+f2)/2) between the higher resonance frequency and the lower resonance frequency.

As apparent from FIG. 5, when the frequency of the high-frequency high-voltage generator 11 is set to a frequency within this frequency region, the voltage at the power reception device side passive electrode is lowered to a value about ½ to about ⅓ as high as the voltage obtained with the frequency of the high-frequency high-voltage generator 11 set to f1.

As can be seen from FIG. 6, the frequency region inclusive of the higher resonance frequency f2 and the mid-frequency ((f1+f2)/2) between the higher resonance frequency and the lower resonance frequency is a frequency region such that the phase difference between the phase of an electric potential difference between the power transmission device side active electrode and the power transmission device side passive electrode and the phase of an electric potential difference between the power reception device side active electrode and the power reception device side passive electrode assumes an absolute value of not less than zero degrees and less than 90 degrees.

Therefore, by setting the absolute value of the phase difference between the phase of an electric potential difference between the power transmission device side active electrode and the power transmission device side passive electrode and the phase of an electric potential difference between the power reception device side active electrode and the power reception device side passive electrode to a value of not less than zero degrees and less than 90 degrees, the voltage at the power reception device side passive electrode is lowered to a value about ½ to about ⅓ as high as the voltage obtained with the frequency of the high-frequency high-voltage generator 11 set to f1.

Figure 7:
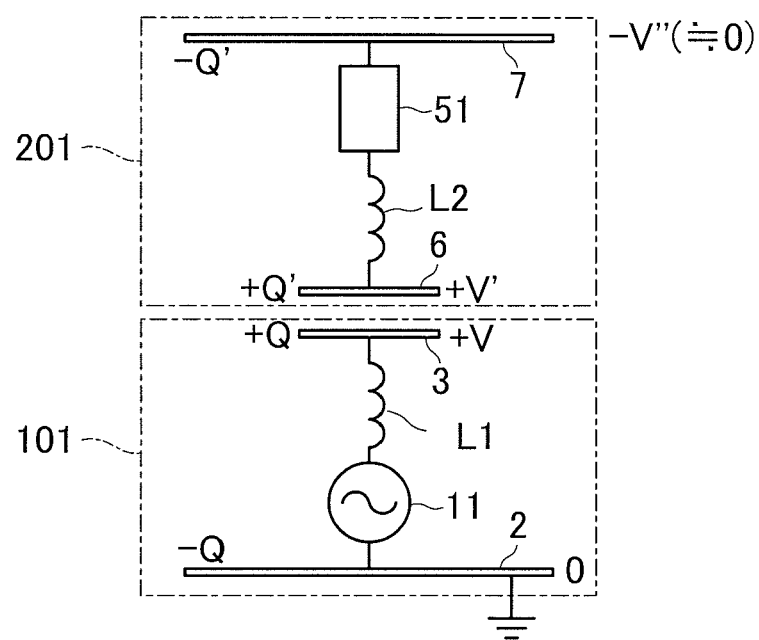
FIG. 7 is a diagram illustrating exemplary instantaneous electric potentials imposed on active electrodes and passive electrodes when the frequency of a high-frequency high-voltage generator 11 is set to a higher resonance frequency f2.

FIG. 7 illustrates exemplary instantaneous electric potentials imposed on active electrodes and passive electrodes when the frequency of the high-frequency high-voltage generator 11 is set to the higher resonance frequency f2. As shown in FIG. 7, the charge generated on the active electrode 3 of the power transmission device 101 and that generated on the active electrode 6 of the power reception device 201 have the same polarity and, likewise, the charge generated on the passive electrode 2 of the power transmission device 101 and that generated on the passive electrode 7 of the power reception device 201 have the same polarity. When the passive electrode 2 of the power transmission device 101 is connected to the ground, that is, when the electric potential of the passive electrode 2 is the ground potential of the power transmission device), the electric potential of the passive electrode 2 is zero. Therefore, the electric potential of the passive electrode 7 of the power reception device 201 assumes substantially zero V. Since the electric potential of the ground of the power transmission device is equal to or substantially equal to that of the earth ground, the electric potential of the passive electrode of the power reception device 201 is substantially equal to the electric potential of the earth ground.

Second Embodiment

A Second Embodiment includes some exemplary resonance circuit configurations for use in the power transmission device and power reception device.

Figure 8A:
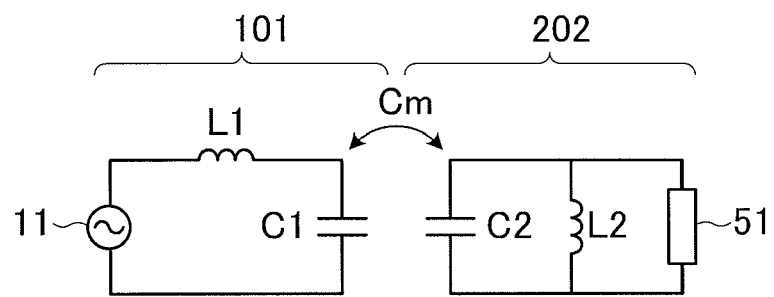
FIG. 8A is a circuit diagram illustrating a power transfer system in which a power transmission device 101 comprises a series-connected LC resonance circuit while a power reception device 202 comprises a parallel-connected LC resonance circuit.
Figure 8B:
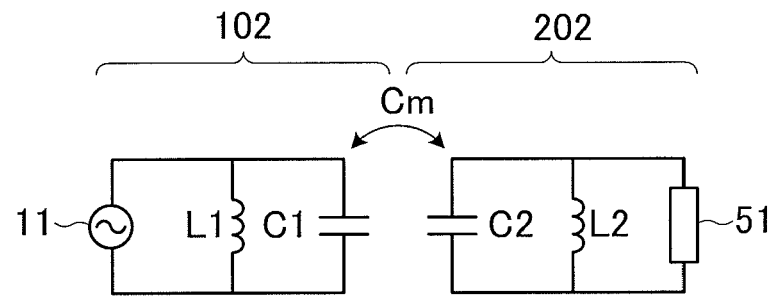
FIG. 8B is a circuit diagram illustrating a power transfer system in which a power transmission device 102 comprises a parallel-connected LC resonance circuit while a power reception device 202 comprises a parallel-connected LC resonance circuit.

FIG. 8A illustrates an exemplary configuration in which a power transmission device 101 comprises a series-connected LC resonance circuit while a power reception device 202 comprises a parallel-connected LC resonance circuit. FIG. 8B illustrates an exemplary configuration in which a power transmission device 102 comprises a parallel-connected LC resonance circuit while a power reception device 202 comprises a parallel-connected LC resonance circuit. As shown, it is sufficient that the two resonance circuits are capacitively coupled to each other. Each of the power transmission device side resonance circuit and the power reception device side resonance circuit may comprise a series-connected resonance circuit or a parallel-connected resonance circuit, whichever desired. The degree of capacitive coupling is any desired degree. With increasing coupling capacitance Cm, the frequency difference between the lower resonance frequency f1 and the higher resonance frequency f2 increases as can be understood from the expressions (2) and (3) and, hence, the degree of coupling increases.

Figure 9:
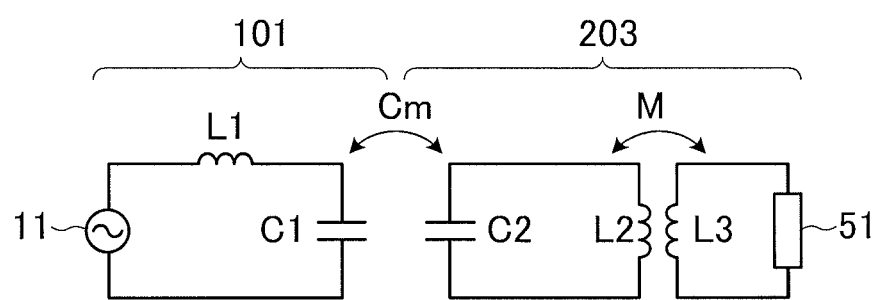
FIG. 9 is a circuit diagram illustrating a power transfer system in which a power transmission device 101 comprises a series-connected LC resonance circuit while a power reception device 203 comprises a series-connected LC resonance circuit and an inductor L3 inductively coupled to an inductor L2.

FIG. 9 illustrates an exemplary configuration in which a power transmission device 101 comprises a series-connected LC resonance circuit while a power reception device 203 comprises a series-connected LC resonance circuit and an inductor L3 inductively coupled to an inductor L2. With this configuration, the degree of coupling between the resonance circuit and the load 51 in the power reception device 203 can be determined from the degree of inductive coupling (i.e., transformer coupling). By lowering the degree of coupling, the resonance characteristics of the resonance circuit which are susceptible to load fluctuations can be stabilized.

Third Embodiment

A Third Embodiment includes several exemplary electrode structures for use in the power transmission device and power reception device.

FIGS. 10A to 10E are each a sectional view schematically illustrating a power transfer system according to the Third Embodiment. In the example shown in FIG. 10A, an active electrode 3 of a power transmission device 103 and an active electrode 6 of a power reception device 203, as well as a passive electrode 2 of the power transmission device 103 and a passive electrode 7 of the power reception device 203, are opposed to each other.

Figure 10A:
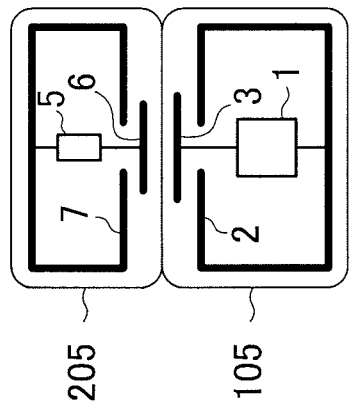
FIGS. 10A to 10E are each a sectional view schematically illustrating a power transfer system according to a Third Embodiment.
Figure 10B:
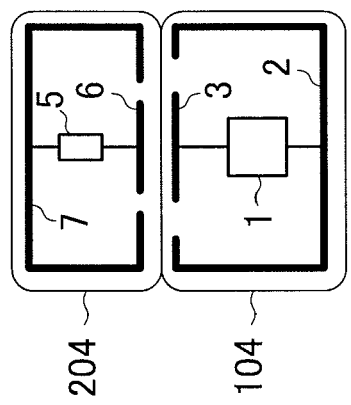

In the example shown in FIG. 10B, a passive electrode 2 of a power transmission device 104 is opposed to a passive electrode 7 of a power reception device 204. In the vicinity of an upper surface of the housing of the power transmission device 104, there are formed a power transmission device side active electrode 3 and the power transmission device side passive electrode 2 which surrounds the active electrode 3 so as to be isolated from the active electrode 3. In the housing of the power transmission device 104, a high-frequency high-voltage generator circuit 1 is disposed which is configured to apply a high voltage of high frequency to the active electrode 3 and the passive electrode 2. The passive electrode 2 extends along an inner peripheral surface of the housing. Therefore, the high-frequency high-voltage generator circuit 1 is covered with the passive electrode 2.

The housing of the power transmission device 104 is a molded member of a plastic such as ABS resin for example. By molding the housing integrally with the active electrode 3 and passive electrode 2 in such a manner as to position these electrodes inside the housing, the housing has an outer surface with an insulating structure.

In the vicinity of a lower surface of the housing of the power reception device 204, there are formed a power reception device side active electrode 6 and a power reception device side passive electrode 7 which surrounds the active electrode 6 so as to be isolated from the active electrode 6. In the housing of the power reception device 204, a load circuit 5 is disposed which is associated with electric power induced between the active electrode 6 and the passive electrode 7. In this example, the passive electrode 7 extends along an inner peripheral surface of the housing. Therefore, the load circuit 5 is covered with the passive electrode 7.

The housing of the power reception device 204 is also a molded member of a plastic such as ABS resin for example. By molding the housing integrally with the active electrode 6 and passive electrode 7 in such a manner as to position these electrodes inside the housing, the housing has an outer surface with an insulating structure.

The active electrode 3 of the power transmission device 104 is shaped circular. The passive electrode 2 has a circular opening positioned coaxially with the active electrode 3. That is, the passive electrode 2 is positioned to surround the active electrode 3 so as to be isolated from the active electrode 3. The active electrode 6 of the power reception device 204 is also shaped circular. The passive electrode 7 has a circular opening positioned coaxially with the active electrode 6 and hence is positioned to surround the active electrode 6 so as to be isolated from the active electrode 6.

Such a structure enables the capacitance between the power transmission device side passive electrode 2 and the power reception device side passive electrode 7 to increase, thereby reducing electric potential fluctuations of the passive electrodes 2 and 7.

Figure 10C:
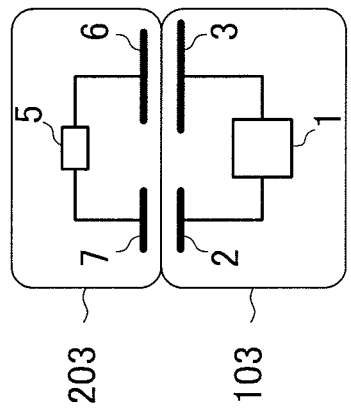

In the example shown in FIG. 10C, a power transmission device 105 includes a passive electrode 2 with a smaller opening than in the example of FIG. 10B and an active electrode 3 located at a position projecting from a surface of the passive electrode 2 (i.e., the surface which is opposed to a passive electrode 7 of a power reception device 205). Likewise, the power reception device 205 includes the passive electrode 7 with a smaller opening than in the example of FIG. 10B and an active electrode 6 located at a position projecting from a surface of the passive electrode 7 (i.e., the surface which is opposed to the passive electrode 2 of the power transmission device 105).

With such a structure, the active electrodes 3 and 6 and the openings of the passive electrodes 2 and 7 can be located to have positional relations therebetween with a higher degree of freedom.

Figure 10D:
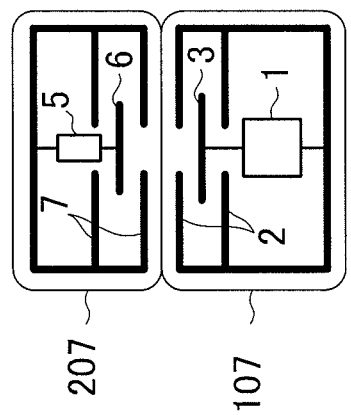

In the example shown in FIG. 10D, a power transmission device 106 includes a passive electrode 2 with an opening and an active electrode 3 positioned more inwardly than the opening of the passive electrode 2. Likewise, a power reception device 206 includes a passive electrode 7 with an opening and an active electrode 6 positioned more inwardly than the opening of the passive electrode 7.

Such a structure enhances the electric field shielding effect of the passive electrodes 2 and 7 over the active electrodes 3 and 6, thereby making it possible to further reduce electric field radiation toward the outside (i.e., leakage electric field). This structure also enables the capacitance between the passive electrodes 2 and 7 to increase, thereby further reducing electric potential fluctuations of the passive electrodes 2 and 7.

Figure 10E:
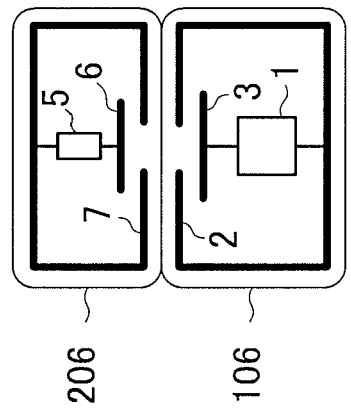

In the example shown in FIG. 10E, a power transmission device 107 includes an active electrode 3 and a passive electrode 2 extending above and below the active electrode 3. Likewise, a power reception device 207 includes an active electrode 6 and a passive electrode 7 extending above and below the active electrode 6.

Such a structure enhances the shielding effect of the passive electrode 2 over a high-frequency high-voltage generator circuit 1, as well as the shielding effect of the passive electrode 7 over a load circuit 5. Since the passive electrodes 2 and 7 extend between the active electrodes 3 and 6, the degree of freedom in establishing a resonant capacitance C can be improved.

Fourth Embodiment

A Fourth Embodiment includes exemplary structures for setting the resonance frequencies of resonance circuits used in the power transmission device and power reception device.

Figure 11A:
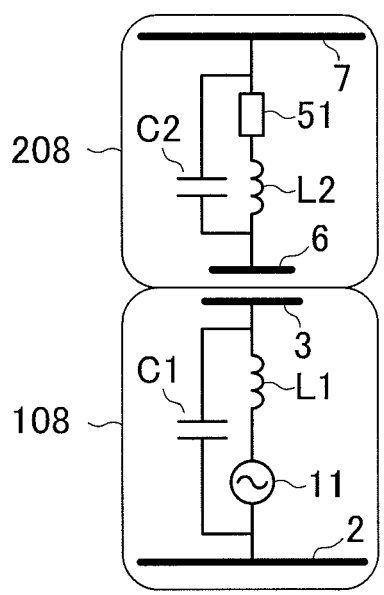
FIGS. 11A and 11B are each a diagram illustrating a structure for setting a resonance frequency of a resonance circuit in each of a power transmission device and a power reception device.

In the example shown in FIG. 11A, a power transmission device 108 includes an inductor L1 connected to a high-frequency high-voltage generator 11 in series and a capacitor C1 connected between an active electrode 3 and a passive electrode 2. A power reception device 208 includes an inductor L2 connected to a high-frequency high-voltage load 51 in series and a capacitor C2 connected between an active electrode 6 and a passive electrode 7.

The equivalent circuit of this power transfer system is as shown in FIGS. 3A and 3B. In setting the resonance frequency of the resonance circuit in the power transmission device 108 to a predetermined frequency, the inductances of the inductors L1 and L2 or the capacitances of the capacitors C1 and C2 are simply determined. Capacitance components distributed over the electrodes 2, 3, 6 and 7 contributing to coupling are also counted into the capacitances of the resonance circuits.

Figure 11B:
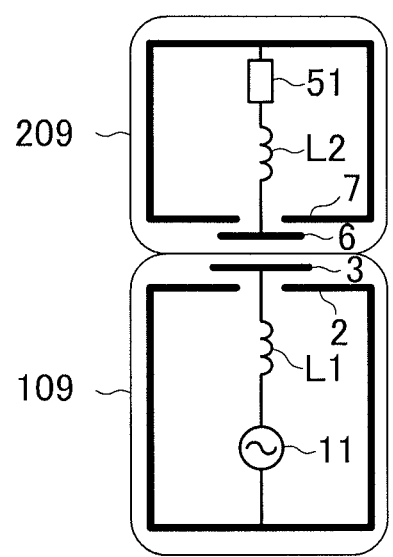

In the example shown in FIG. 11B, a power transmission device 109 includes an inductor L1 connected to a high-frequency high-voltage generator 11 in series. A power reception device 209 includes an inductor L2 connected to a high-frequency high-voltage load 51 in series. When the passive electrode 2 of the power transmission device and the passive electrode 7 of the power reception device which face each other are coupled to each other, a relatively large floating capacitance is generated between the active electrodes and the passive electrodes. Without the need to provide the capacitors C1 and C2 as the components shown in FIG. 11A, the resonance frequencies of the resonance circuits can be set by utilizing such a floating capacitance.

Fifth Embodiment

Figure 12:
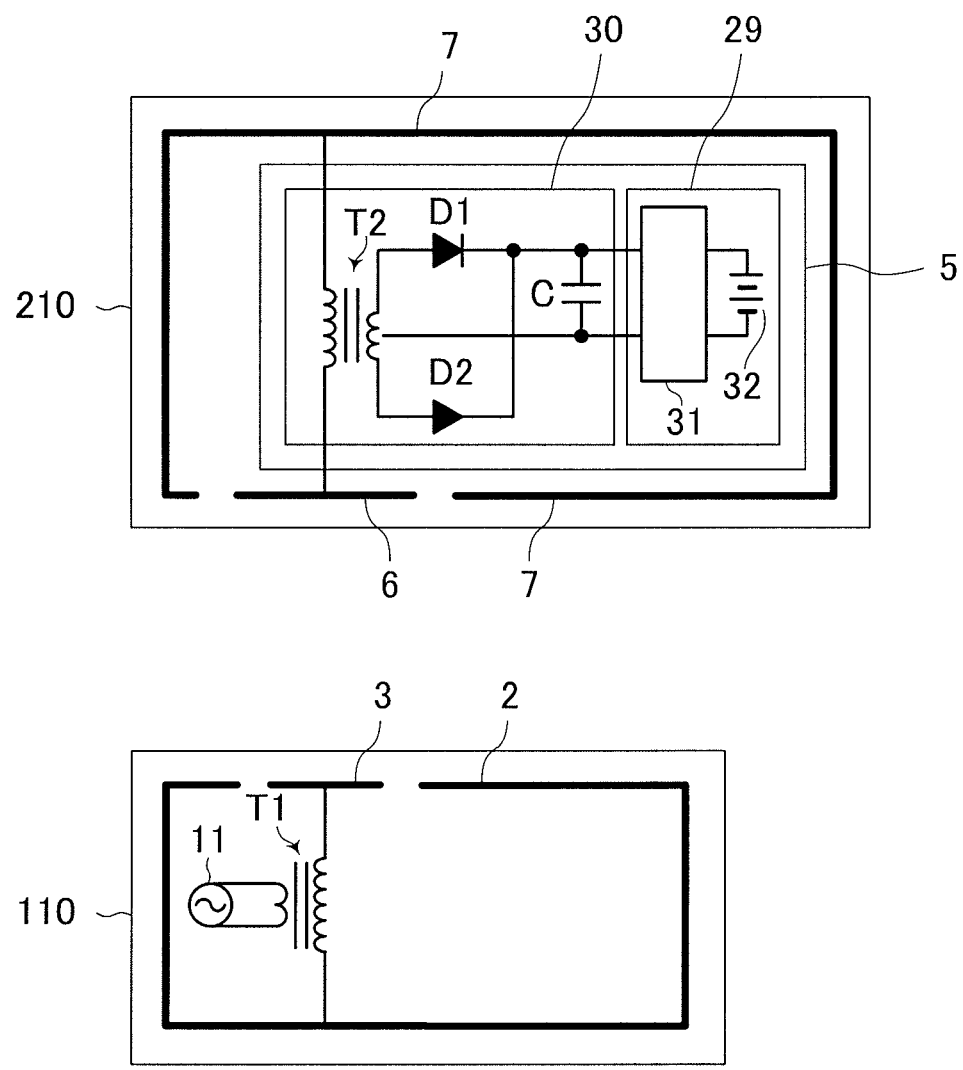
FIG. 12 is a circuit diagram illustrating a power transmission device 110 and a power reception device 210.

A Fifth Embodiment includes a specific configuration of a high-frequency high-voltage generator circuit in the power transmission device and a specific configuration of a high-frequency high-voltage load circuit in the power reception device. FIG. 12 is a circuit diagram illustrating a power transmission device 110 and a power reception device 210.

The power transmission device 110 includes a high-frequency high-voltage generator 11 and a step-up transformer T1 having a primary winding connected to the high-frequency high-voltage generator 11 and a secondary winding connected between an active electrode 3 and a passive electrode 2.

The power reception device 210 includes a load circuit 5 comprising a rectifier smoothing circuit 30 and a low voltage circuit portion 29. The rectifier smoothing circuit 30 includes a step-down transformer T2, rectifier diodes D1 and D2, and a smoothing capacitor C. The transformer T2 has a primary winding with one end connected to an active electrode 6 and the other end connected to a passive electrode 7. A secondary winding of the transformer T2 is connected to a full-wave rectifier circuit comprising the rectifier diodes D1 and D2 and the smoothing capacitor C.

In the example shown, the power reception device 210 forms a noncontact charger device in which the low voltage circuit portion 29 includes a control circuit 31 and a secondary battery 32 which operate using a voltage rectified and smoothed by the rectifier smoothing circuit 30 as a power source. The control circuit 31 performs a charge control over the secondary battery 32, a charge control using the secondary battery 32 as a power source, and other predetermined circuit operations.

The power reception device may further include an additional device connected to the low voltage circuit portion 29, though such an additional device is not shown in FIG. 12.

The high-frequency high-voltage generator 11 is configured to generate a high voltage having a high frequency ranging from 100 kHz to several tens of MHz for example. This frequency is a fixed frequency corresponding to the higher frequency of coupled modes described earlier.

REFERENCE SIGNS LIST

Cm coupling capacitance
D1,D2 rectifier diode
f1 lower resonance frequency
f2 higher resonance frequency
L1,L2,L3 inductor
T1 step-up transformer
T2 step-down transformer
1 high-frequency high-voltage generator circuit
2 power transmission device side passive electrode
3 power transmission device side active electrode
5 high-frequency high-voltage load circuit
6 power reception device side active electrode
7 power reception device side passive electrode
11 high-frequency high-voltage generator
29 low voltage circuit portion
30 rectifier smoothing circuit
31 control circuit
32 secondary battery
51 high-frequency high-voltage load
100-110 power transmission device
200-210 power reception device

The invention claimed is:

1. A power transfer system comprising:
a power transmission device including a power transmission device side active electrode, a power transmission device side passive electrode, and a high-frequency high-voltage generator circuit configured to generate a high voltage of high frequency to the power transmission device side active electrode and the power transmission device side passive electrode; and
a power reception device including a power reception device side active electrode opposed to the power transmission device side active electrode, a power reception device side passive electrode, and a high-frequency high-voltage load circuit connected between the power reception device side active electrode and the power reception device side passive electrode, wherein the high-frequency high-voltage generator circuit generates the high voltage with the high frequency being a frequency such that a phase difference between a first phase of a first electric potential difference between the power transmission device side active electrode and the power transmission device side passive electrode and a second phase of a second electric potential difference between the power reception device side active electrode and the power reception device side passive electrode has an absolute value of not less than zero degrees and less than 90 degrees.

2. The power transfer system according to claim 1, wherein a first resonance frequency of a power transmission circuit comprising the power transmission device side active electrode, the power transmission device side passive electrode and the high-frequency high-voltage generator circuit is substantially equal to a second resonance frequency of a power reception circuit comprising the power reception device side active electrode, the power reception device side passive electrode and the high-frequency high-voltage load circuit, and wherein the high-frequency high-voltage generator circuit generates the high voltage at a higher frequency of frequencies of two coupled modes that occur when the power transmission device and the power reception device are coupled to each other.

3. The power transfer system according to claim 1, wherein the power transmission device side passive electrode has an electric potential substantially equal to a ground potential.

4. The power transfer system according to claim 1, wherein the power transmission device side passive electrode is larger in size than the power transmission device side active electrode.

5. The power transfer system according to claim 1, wherein the power reception device side passive electrode is larger in size than the power reception device side active electrode.

6. The power transfer system according to claim 1, wherein the power transmission device side passive electrode is arranged so as to oppose the power reception device side passive electrode when the power transmission device side active electrode is opposed to the power reception device side active electrode.

7. The power transfer system according to claim 1, wherein the power transmission device and the power reception device each include an LC resonance circuit.

8. The power transfer system according to claim 1, wherein the power transmission device includes a series-connected LC resonance circuit and the power reception device includes a parallel-connected LC resonance circuit.

9. The power transfer system according to claim 1, wherein the power transmission device includes a first parallel-connected LC resonance circuit and the power reception device includes a second parallel-connected LC resonance circuit.

10. The power transfer system according to claim 1, wherein the power transmission device and the power reception device each include a series-connected LC resonance circuit.

11. The power transfer system according to claim 7, wherein the power reception device further includes an inductor inductively coupled to an inductor of the LC resonance circuit.

12. The power transfer system according to claim 1, wherein the power transmission device further includes a step-up transformer connected to the high-frequency high-voltage generator circuit.

13. The power transfer system according to claim 12, wherein the high-frequency high-voltage load circuit includes a rectifier smoothing circuit and a low voltage circuit portion.

* * * * *